UNITED STATES PATENT OFFICE.

GEORGE H. MOORE, OF NORWICH, CONNECTICUT, AND LOUIS BAGGER, OF WASHINGTON, DISTRICT OF COLUMBIA; SAID MOORE ASSIGNOR OF HIS RIGHT TO ESTELLE C. MOORE, OF NORWICH, CONNECTICUT.

IMPROVEMENT IN LITHOGRAPHIC STONES.

Specification forming part of Letters Patent No. 141,943, dated August 19, 1873; application filed January 11, 1873.

*To all whom it may concern:*

Be it known that we, GEORGE H. MOORE, of Norwich, in the county of New London and State of Connecticut, and LOUIS BAGGER, of Washington, in the county of Washington and District of Columbia, have invented certain new and useful Improvements in Lithographic Stones, of which the following is a specification:

This invention has for its object economy in the use of lithographic stones, or stones from which impressions, etchings, or engravings may be taken upon paper or other suitable material; and said object is attained by forming a body or base of artificial stone, to which is affixed a thin slab or facing of the natural lithographic stone.

To carry out our invention, the natural lithographic stone is sawn into slabs of any suitable dimensions. Thus, for instance, from a slab of natural lithographic stone four inches thick, four slabs of equal thickness may be cut; and by means of an artificial-stone composition, formed of suitable ingredients, substantially as hereinafter described, four single-faced or two double-faced lithographic stones may be produced, each of which will answer the same practical purpose for which the thick and necessarily expensive block of stone is used. These slabs are then, preferably, prepared as follows: One surface of the slab is made level, and it is then placed, with its level surface down, upon a bed also made level. A raised edge or rim of wood or other suitable material is formed or placed around it in such a manner as to form a mold or receptacle of the desired shape for the plastic material which is to form the artificial-stone body, base, or back, or intermediate section. This material, when placed in the mold, is carefully tamped or pressed by suitable means, after which any surplus material is removed in the usual manner and the plastic surface "finished." By the subsequent hardening of the artificial body, base, or back thus formed, a single-faced lithographic stone is produced. The double-faced stone, on which engravings or etchings may be made on both sides, we produce by placing another slab of the natural lithographic stone on top of the artificial-stone composition while it is plastic in the mold, and by pressure cause it to adhere to the same. By this latter process a stone is produced composed on two sides of a natural lithographic-stone facing, with an intermediate section of artificial stone.

If desired, slabs of the natural lithographic stone of irregular outline may be affixed to an artificial-stone body or base of regular outline, and said body or base surrounded by a frame of iron or other suitable material; also, more than one slab of the natural lithographic stone may be affixed to or upon a common body or base, so as to produce any required number of square or superficial feet of surface from which impressions may be taken.

By the use of molds any form may be given to the artificial-stone composition used to produce said body or base, and the natural lithographic-stone slabs may be shaped as desired.

It is important that each slab of natural lithographic stone have a perfect bearing upon the artificial-stone body or base to which it is affixed; also, the artificial-stone body or base be sufficiently thick, compact, tenacious, and rigid, that it may not break when used in the press.

A suitable artificial-stone composition to form said body or base may consist, in about the following proportions by measure, of one part protoxide of manganese, three parts Portland cement, two parts clean sharp sand, two parts concentrated solution of silicate of soda or potash. If the above composition is not as plastic as may be desired, water should be added containing a small proportion of sulphuric acid, until the desired consistency is attained.

When an artificial-stone composition, or a solution that will combine with or act upon silica or its compounds, is used to form or produce said artificial-stone body or base, we prefer to moisten with a solution of silicate of soda or potash that part of the natural lithographic stone which is to be placed directly in contact with the body or base.

We do not confine ourselves to the particular artificial-stone composition herein mentioned, as any other artificial-stone compound that is, when hard, sufficiently compact, tenacious, and rigid, is suitable to form said body or base.

We are aware that natural lithographic stones have been backed by another lithographic or other natural stones, and held together temporarily by means of a cement formed of plaster of Paris; but we are not aware that natural lithographic stones have ever been permanently or otherwise affixed to or upon a body or base formed solely of an artificial-stone composition.

Having thus described our invention, what we claim as new, and desire to secure by Letters Patent, is—

A lithographic stone composed of one or more slabs of natural lithographic stone permanently embedded in, or united by or to, a body, base, or back formed of an artificial-stone composition, substantially as herein described, and for the purpose specified.

GEORGE H. MOORE.
LOUIS BAGGER.

Witnesses:
ALBERT H. NORRIS,
WILLIAM BAGGER.